United States Patent [19]
Hiekali

[11] Patent Number: 5,619,500
[45] Date of Patent: Apr. 8, 1997

[54] ATM NETWORK INTERFACE

[75] Inventor: Nasser Hiekali, San Jose, Calif.

[73] Assignee: Digital Link Corporation, Sunnyvale, Calif.

[21] Appl. No.: 299,737

[22] Filed: Sep. 1, 1994

[51] Int. Cl.$^6$ ................................................. H04L 12/56
[52] U.S. Cl. .......................... 370/414; 370/396; 370/401; 370/419
[58] Field of Search .................... 370/94.1, 94.2, 370/85.6, 85.13, 58.2, 60, 60.1, 99

[56] References Cited

U.S. PATENT DOCUMENTS

| | | | |
|---|---|---|---|
| 5,083,269 | 1/1992 | Syobatake et al. | 370/94.1 |
| 5,126,999 | 6/1992 | Munter et al. | 370/85.6 |
| 5,233,606 | 8/1993 | Pashan et al. | 370/85.6 |
| 5,278,828 | 1/1994 | Chao | 370/85.6 |
| 5,327,421 | 7/1994 | Hiller et al. | 370/94.2 |
| 5,357,506 | 10/1994 | Sugawara | 370/94.1 |

*Primary Examiner*—Douglas W. Olms
*Assistant Examiner*—Min Jung
*Attorney, Agent, or Firm*—Steven F. Caserza; Flehr, Hohbach, Test, Albritton & Herbert

[57] ABSTRACT

A novel ATM network provided which includes one or more ATM gateways for interfacing a plurality of T1 or fractional T1 signals with a higher bandwidth ATM network switch. In order to provide high speed and bandwidth utilizing relatively inexpensive and standard components, the data is stored in a memory, such as a video RAM, and pointers are utilized to indicate the type of each piece of data stored in the memory, including its priority for transmission to an ATM switch. In one embodiment of this invention, a plurality of pointer pools are used, each corresponding to a data type having a given priority. Pointers are placed into an appropriate one of the pools to define the order in which data will be transferred to the ATM switch in accordance with the priority of the data type and the receiving bandwidth of its destination in the ATM network. In one embodiment an HDLC controller is used which is suitable for framing a plurality of channels of data received on an incoming data path, such as a T1 channel. In order to minimize processing hardware requirements, a single HDLC controller is used to provide appropriate framing of each channel in a multiplexed fashion, with intermediate HDLC states being stored in a temporary state memory for retrieval when the next set of bits for a given channel is received for processing by the HDLC controller. A plurality of buffer memories are used for storing intermediate data corresponding to each of the incoming channels.

23 Claims, 10 Drawing Sheets

ATM NETWORK INTERFACE

FIELD OF THE INVENTION

This invention pertains to telecommunication and more specifically to asynchronous transfer mode (ATM) networks and interfaces between such ATM networks and one or more types of access networks.

BACKGROUND

FIG. 1 is a diagram depicting a typical prior art telecommunications network, in which three site locations have a need for telecommunications therebetween. In the prior art, dedicated lines, such as single user phone lines, are leased and connected between each of the three sites. For greater bandwidth, these interconnecting leased lines may be T1 lines, which are equivalent to 24 single voice channels, or a data rate of 1.544 megabits/second, or T3 lines, having a bandwidth equivalent to a plurality of T1 lines, having a bandwidth of 44.736 megabits/second. Such lines are expensive to lease, and are somewhat clumsy when a user's needs vary or are significantly less than the full bandwidth provided by a T1 or T3 leased line, since the user must lease and pay for unneeded capacity. While reference is made in this application to T1 and T3 lines and capacities, it is understood that in other parts of the world E1 and E3 lines are the standards, with an E1 line having a capacity of 32 voice channels as compared with the 24 voice channels of the T1 standard.

While there exists prior art switches which allow the multiplexing of a plurality of fractional T1 bandwidth lines into a single T1 signal, a more modern approach is the use of an asynchronous transfer mode (ATM) network, as depicted in FIG. 2. FIG. 2 depicts a system including an ATM network 201 which includes a plurality of high bandwidth data switches 202-1 through 202-N, and appropriate high speed links therebetween. Such links are typically T3 links at the present time. ATM network 201 is maintained by a long distance carrier company, such as AT&T or MCI, the local phone company, an international carrier, or private network. Individual users located at sites 205-1 through 205-N connect into ATM network 201 at their local ATM network access points and share resources of the ATM network in order to communicate with a distant site. This sharing of ATM network resources provides for more economical telecommunications in that ATM network facilities are shared among a number of users in a time varying fashion to account for variation in individual site needs over time. The use of the ATM network also reduces the number of telecommunication lines, since a complete permutation of telecommunication lines between sites which must communicate with each other is no longer needed.

However, there remains a difficulty in the implementation of the ATM network in that there is a mismatch between the T3 minimum bandwidth access to switches 202-1 through 202-N of ATM network 201, and the T1 or fractional T1 bandwidth of a number of users seeking access to ATM network 201. This difficulty is exacerbated by the fact that there exists a number of data communication standards which are commonly used and which are not compatible with a single T3 signal. Such existing widely used standards include the previously mentioned 24 voice channels multiplexed on a T1 carrier, frame relay protocol, switched multi-megabit data service (SMDS) interface protocol (SIP) relay formed from a plurality of 56k bit per second data channels, video signals (for example, MPEG standard), and the ATM protocol itself.

SUMMARY

According to the teachings of this invention, a novel ATM network is provided which includes one or more ATM gateways for interfacing a plurality of T1 or fractional T1 signals with a higher bandwidth ATM network switch. In order to provide high speed and bandwidth utilizing relatively inexpensive and standard components, the data is stored in a memory, such as a video RAM, and pointers are utilized to indicate the type of each piece of data stored in the memory, including its priority for transmission to an ATM switch. In one embodiment of this invention, a plurality of pointer pools are used, each corresponding to a data type having a given priority. Pointers are placed into an appropriate one of the pools to define the order in which data will be transferred to the ATM switch in accordance with the priority of the data type and the receiving bandwidth of its destination in the ATM network.

As a feature of this invention, in one embodiment an HDLC controller is used which is suitable for framing a plurality of channels of data received on an incoming data path, such as a T1 channel. In order to minimize processing hardware requirements, a single HDLC controller is used to provide appropriate framing of each channel in a multiplexed fashion, with intermediate HDLC states being stored on a temporary state memory for retrieval when the next set of bits for a given channel is received for processing by the HDLC controller. A plurality of buffer memories are used for storing intermediate data corresponding to each of the incoming channels.

DESCRIPTION OF SPECIFIC EMBODIMENTS

In accordance with the teachings of this invention, an ATM gateway is provided to interface a plurality of T1 or fractional T1 signals with a higher bandwidth ATM network switch.

Figure 1:
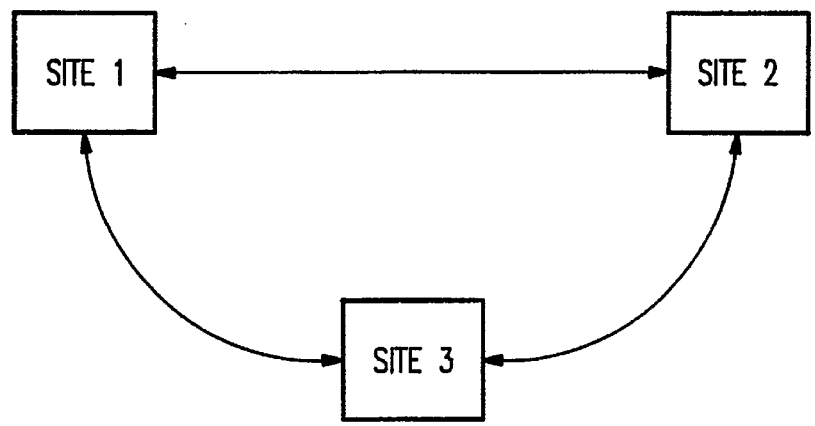
FIG. 1 is a diagram depicting a typical prior art telecommunications network.
Figure 2:
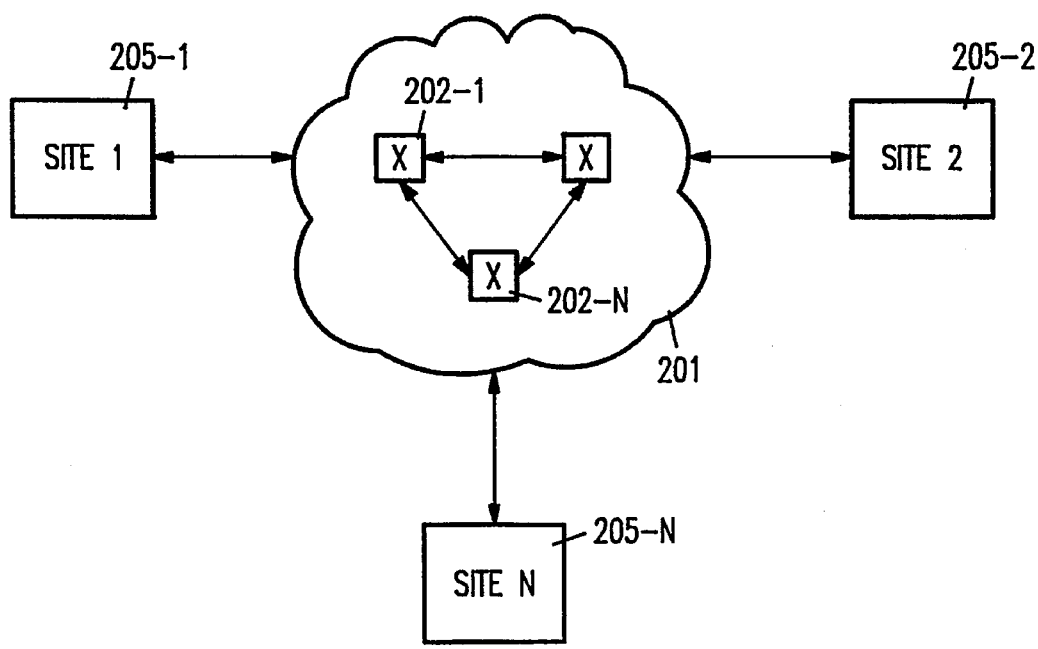
FIG. 2 is a diagram depicting a typical prior art ATM network.
Figure 3:
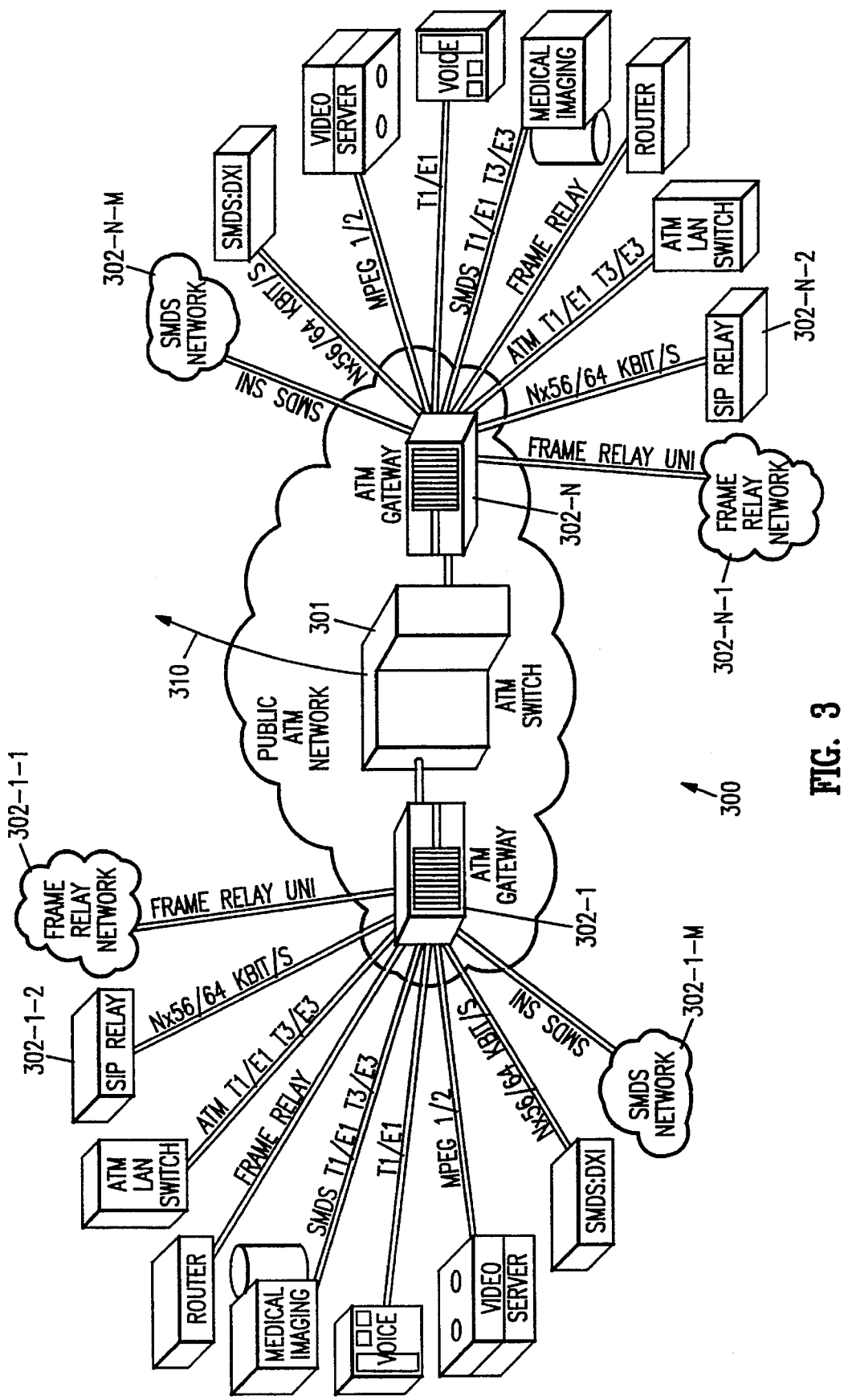
FIG. 3 is a diagram depicting an ATM network including an ATM gateway constructed in accordance with the teachings of this invention.

FIG. 3 shows a diagram depicting such an ATM network 300 including an ATM switch 301, which is typically formed as a plurality of T3 circuits handling ATM protocol data over a wide service area. ATM network 300 also include a plurality of access ports such as access port 310 having the same bandwidth as the ATM network itself. In other words, for the typical current ATM networks formed of a plurality of switches of T3 bandwidth, a number of T3 access ports 310 are provided for users which need a T3 bandwidth access to ATM network. Also included in the ATM network 300 is a plurality of ATM gateways 302-1 through 302-N. Such ATM gateways include a plurality of ports for connection to a number of users utilizing any combination of a variety of standard protocols, such as a frame relay network user 302-1-1, SIP relay user 302-1-2, and the like. ATM gateway 302-1 interfaces between each of these sub T3 users, which require either T1 or fractional T1 bandwidths, and the ATM switch 301. ATM gateway 302-1 also provides any necessary translation between the various user protocols such as frame relay network, SIP relay, and the like, and the ATM protocol used by ATM network 300. ATM gateway 302-1 also provides local switching between these various sub T3 users, if desired.

Figure 4:
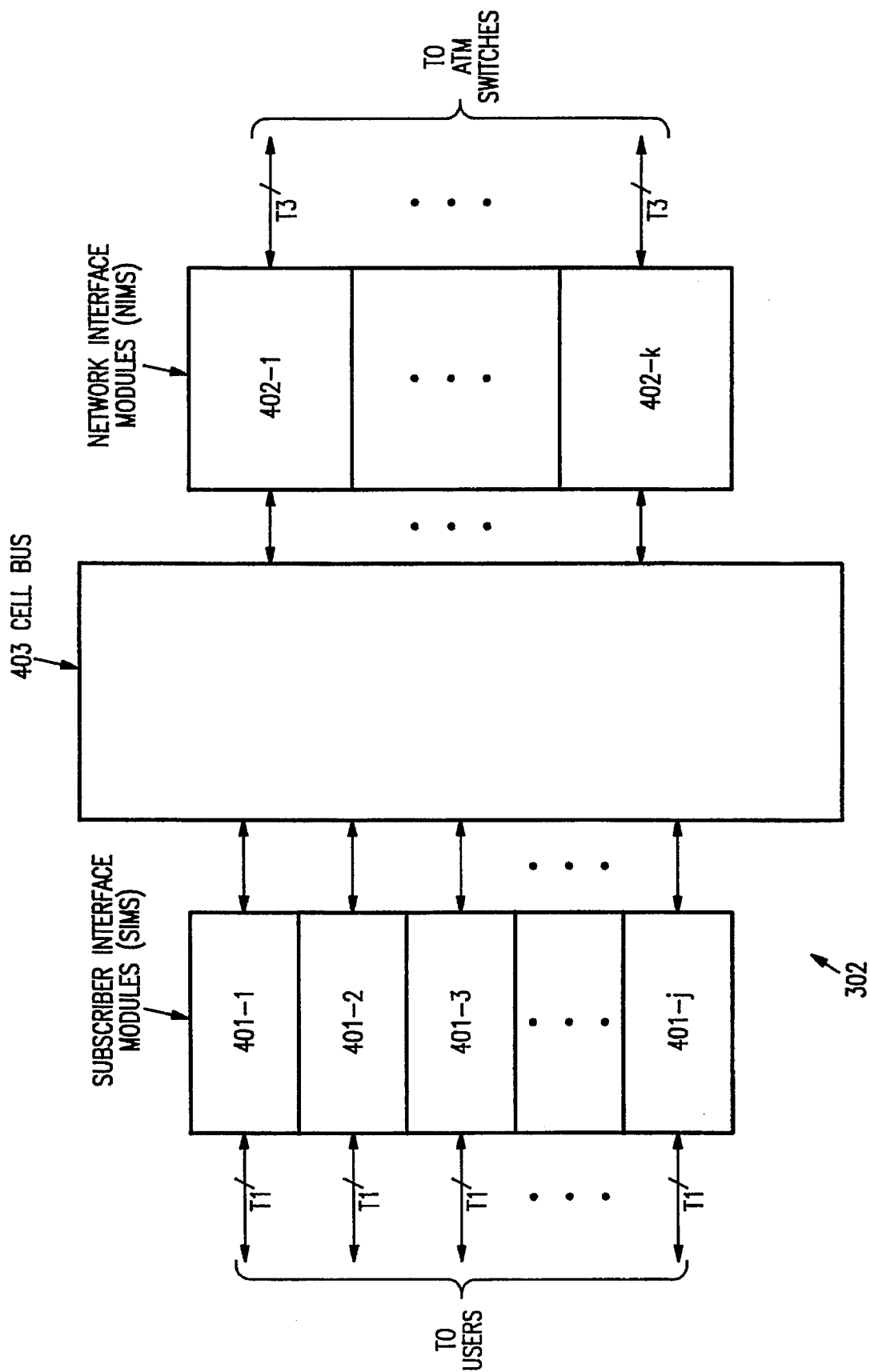
FIG. 4 is a block diagram of a typical ATM gateway of the present invention.

FIG. 4 is a block diagram of a typical ATM gateway 302 of the present invention. ATM gateway 302 includes a plurality of service interface modules (SIMs) 401-1 through 401-j, each of which is capable of communicating to a user who via one or more T1 channels, such users utilizing any one or more of a number of well known protocols. ATM gateway 302 also includes one or more network interface modules (NIMs) 402-1 through 402-k, which interface to ATM switches via one or more wideband lines, associated with the T3 lines currently in widespread use, or in even wider bandwidth lies which will become more widely used in the future. SIMs 401-1 through 401-j are interfaced to NIMs 402-1 through 402-k, or to other SIMs (not shown), via cell bus 403 which is typically formed as a backplane bus into which a plurality of SIM cards and NIM cards are placed.

In one embodiment of this invention, by way of example only, an ATM gateway 302 is formed of nine SIMs, each of which can handle four input ports, each input port having a T1 bandwidth and thus capable of handling either a T1 signal or a fractional T1 signal, and a single NIM which handles two T3 connections to the ATM switch. In this embodiment, the ATM gateway also includes a management processor module (MPM) which for simplicity is not shown in FIG. 4, but which serves to provide configuration capability and storage, automatic fault diagnostics/isolation/recovery, and an external human interface. Also, in one such embodiment, ATM gateway 302 includes, under the control of the MPM, a spare SIM which can be hot swapped to replace a SIM which is diagnosed to have failed, as well as a spare NIM, which can be hot swapped in the event of a failure in one of the NIMs. If desired, ATM gateway 302 also includes a spare MPM for redundancy and therefore greater reliability.

Figure 5:
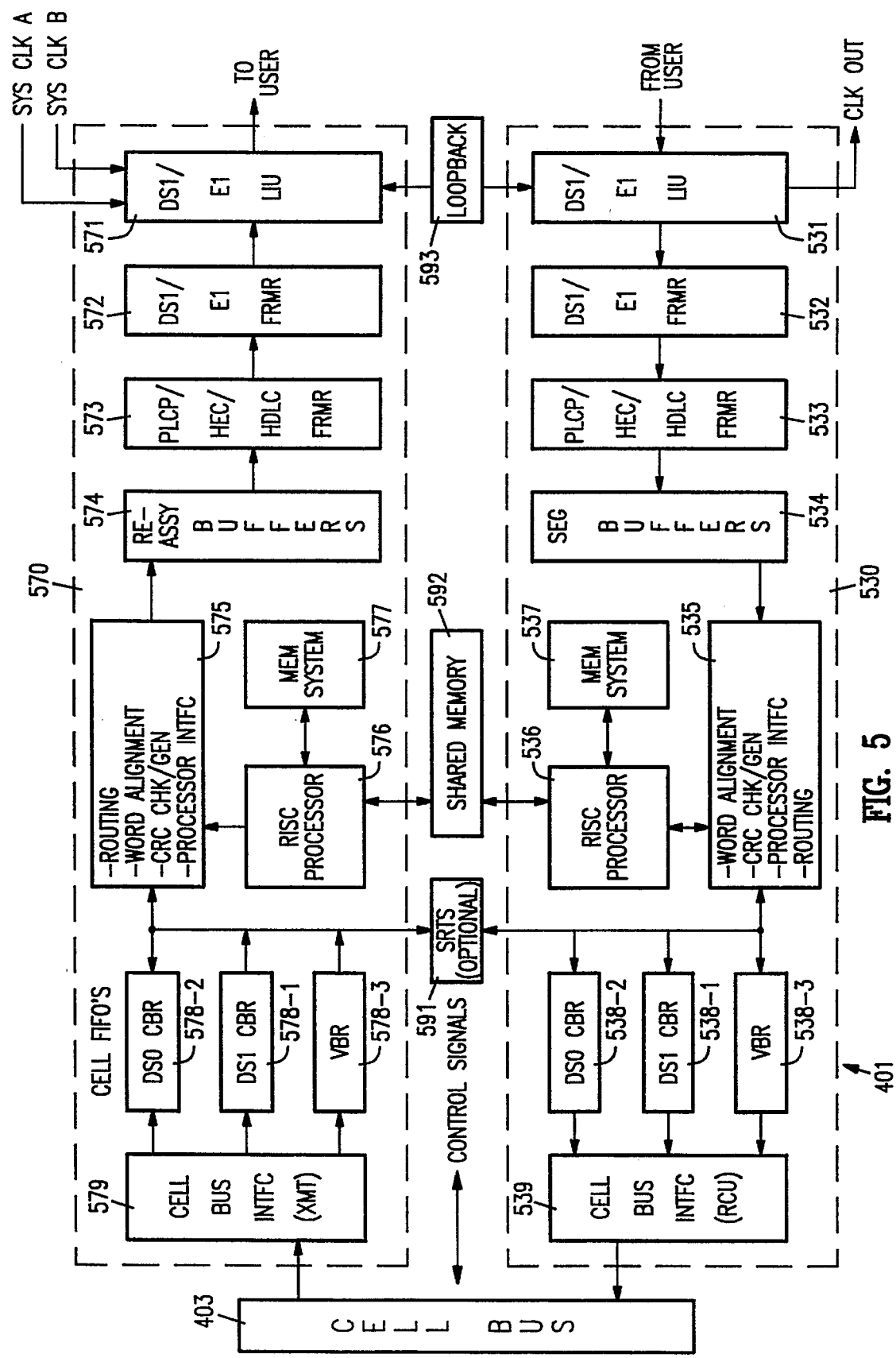
FIG. 5 is a block diagram depicting one embodiment of a subscriber interface module 401 of FIG. 4.

FIG. 5 is a block diagram depicting one embodiment of a subscriber interface module (SIM) 401, previously described in FIG. 4. SIM 401 is an interface between a user, shown on the right side of FIG. 5, and cell bus 403. As previously mentioned, in one embodiment the users utilize sub T3 bandwidths, for example T1 or fractional T1 bandwidths, while cell bus 403 utilizes T3 or higher bandwidths for connection to the ATM switch. When a user sends data to the ATM network, it is received and processed by a RISC processor 536 and other related circuitry on input side 530 of SIM 401 and applied to cell bus 403. Conversely, when a user is to receive information from the ATM network, another RISC processor 576 and other related circuitry on cell bus side 570 of SIM 401 receives and processes information from the ATM network via cell bus 403 and provides it to the user with the appropriate bandwidth and data protocol.

When information is received from a user, it will be received in a non T3 ATM format. This data is received by line interface unit 531 which provides an appropriate electrical termination to a communications link from the user. Data is passed from line interface unit 531 to framer 532, which provides appropriate byte alignment framing of the received data in accordance with a DS1/E1 protocol. This framing is accomplished by monitoring incoming data and detecting framing signals, such as a predefined sequence of bits denoting the beginning and/or end of a data frame. In the event the user is providing a fractional T1 signal, only those channels assigned to that user would be used. SIM 401 utilizes the unused channels, and may fill those unused channels with another user's data, voice, video, or idle patterns.

The properly byte aligned framed data is provided by framer 532 to transmission convergence (Physical Layer Convergence Protocol (PLCP), High Level Data Link (HDLC), or Header Error Control (HEC)) framer 533, which serves to delineate the cells or frames contained in the incoming data. Data frames from framer 533 are provided in a parallel fashion to segmentation buffers 534 which serve to segment the frames into cells. If cells are contained in the incoming data, this function is bypassed. These parallel data cells are provided by segment buffers 534 to processing circuitry 535 which is controlled by microprocessor 536, which has access to memory system 537.

Processing circuitry 535 assists RISC processor 536, by performing a number of functions. First, circuitry 535 performs a word alignment function, which is needed to reduce the number of clock cycles used by processor 535 to align the incoming data to the proper format for processing. Circuitry 535 also performs an error detection and correction function, by generating a CRC on the incoming data and comparing that with a CRC stored as part of the incoming data. Circuitry 535 also performs a processor interfacing function, which serves to insure proper timing to and from the memory system 537, segmentation buffers 534 and circuits 538-1, 538-2 and 538-3. Circuitry 535 also provides the routing information necessary to direct the cells to proper destinations on cell bus 403. The resulting data from processor 535 is applied to one of a plurality of first-in-first-out (FIFO) circuits 538. In the embodiment shown in FIG. 5, three such FIFO circuits 538 are used for the following purposes. FIFO circuit 538-1 provides the highest priority queuing of cells to cell bus 403 of the received information from an entire T1 signal carrying 24 channels of voice/data information. FIFO circuit 538-2 is a buffer which serves to queue individual voice/data channel information, when received from a user with a DS0 data protocol. FIFO circuit 538-3 serves to queue variable bit rate data received from the user to cell bus 403. The output of each FIFO circuit 538-1 through 538-3 is applied to cell bus interface 539 for application to cell bus 403. Naturally, it will be appreciated that other types of FIFO circuits 538 can be employed in accordance with the teachings of this invention in addition to those shown in the exemplary embodiment of FIG. 5. Appropriate information is contained in the incoming data stream from a user to define the type of data being received, allowing the routing function of processor circuit 535 to route received data to the appropriate one of the FIFO circuits 538.

The cell bus side 570 of subscriber interface module 401 operates in a corollary fashion. When information is received from the ATM switch, it is received in a standard ATM format. This data is received by cell bus interface unit 579 for application to FIFO circuits 578-1 through 578-3. FIFO circuits 578-1 through 578-3 correspond generally to FIFO circuits 538-1 through 538-3 of input side 530 of SIM 401. Output data from cell FIFO 578-1 through 578-3 is provided, in accordance with their priorities, to processing circuitry 575 which is assisted by RISC processor 576 to perform a number of functions. These functions are similar to those described previously with respect to input side 530, and include a word alignment function, CRC generation and checking, and a processor interfacing function. The resulting data is provided to reassembly buffers 574 which gathers cells to form the original frames/packet data. The output from reassembly buffers 574 is provided to framer 573 which serves to place the appropriate transmission convergence sublayer framing on the data. The resulting output from framer 573 is applied to framer 572 which serves to insert the appropriate DS1/E1 framing bits into the data. The output from framer 572 is fed to line interface unit 571, which provides an appropriate electrical interface to the user.

In one embodiment of this invention, subscriber interface module 401 includes a loop back circuit 593, which allows for testing of the user's communication link through line interface units 531 and 571, to determine if that portion of the network is operating properly. This feature is helpful for monitoring the condition of the line between subscriber interface module 401 and the user, and help determine when a malfunction is caused by subscriber interface module 401.

Shared memory 592 serves to provide a communications path between RISC processors 536 and 576. Status, configuration and test information is passed between the processors to ensure protocol balancing and proper handling of fault conditions.

In one embodiment, subscriber interface module 401 includes Synchronous Residual Time Stamp (SRTS) which serves to ensure information rate synchronization of the T1 signal utilizing the circuit emulation protocols.

Figure 6:
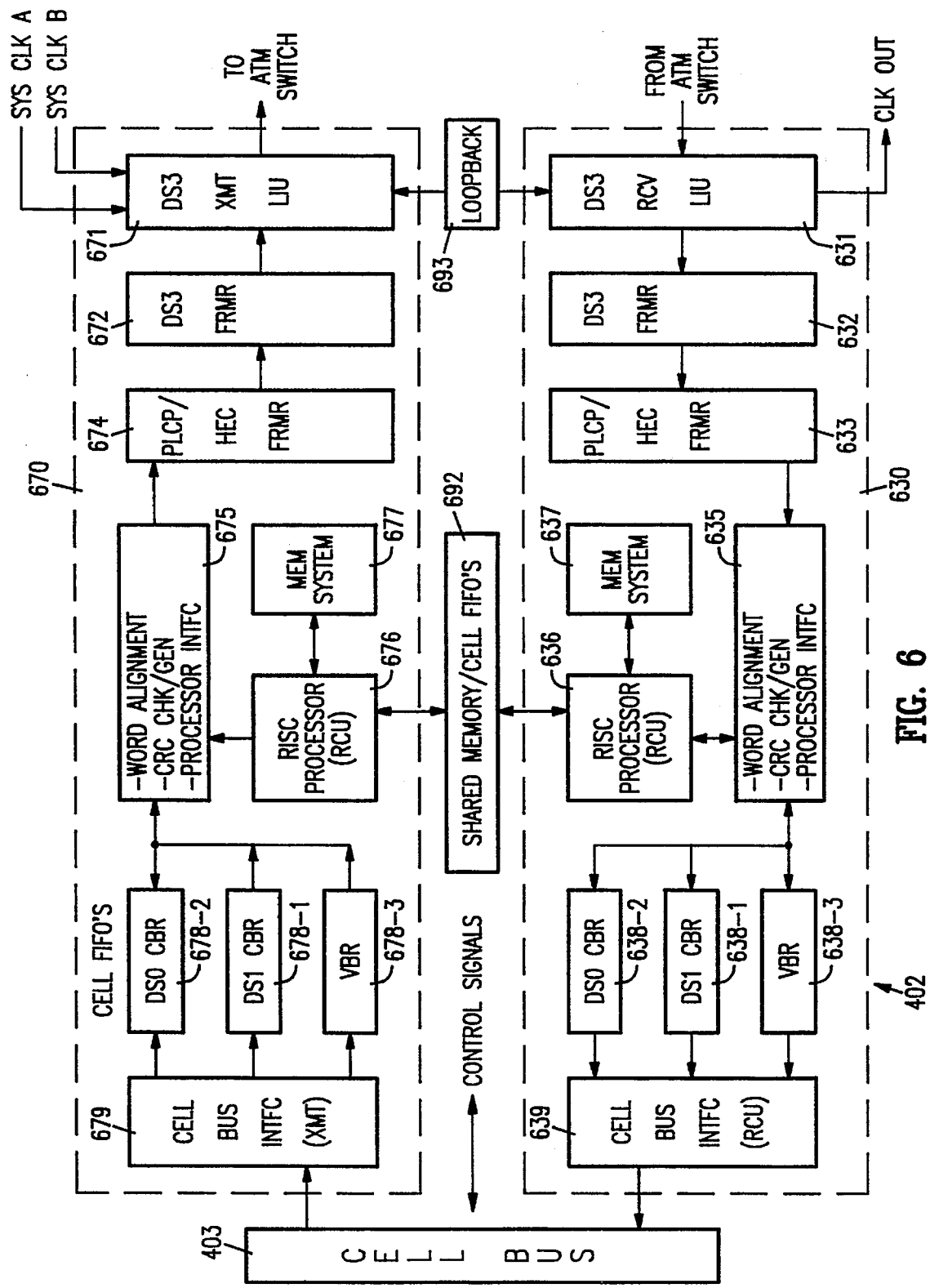
FIG. 6 is a block diagram depicting one embodiment of a network interface module 402 of FIG. 4.

FIG. 6 is a block diagram depicting one embodiment of a network interface module (NIM) 402, previously described in FIG. 4. NIM 402 is an interface between call bus 403, shown on the left side of FIG. 6, and an ATM switch. When the ATM network sends data for a user, it is received and processed by a RISC processor 636 and other related circuitry on input side 630 of NIM 402 and applied to cell bus 403. Conversely, when a user sends information for the ATM network, another RISC processor 676 and other related circuitry on the access side 670 of NIM 402 receives and processes information from cell bus 403 and provides it to the ATM with the appropriate bandwidth and data protocol.

When information is received from the ATM switch, it is received in an ATM format. This data is received by line interface unit 631 which provides an appropriate electrical termination to a communications link from the ATM switch. Data is passed from line interface unit 631 to framer 632, which provides appropriate byte/nibble alignment framing of the received data in accordance with a DS3/E3 protocol. This framing is accomplished by monitoring incoming data and detecting framing signals, such as a predefined sequence of bits denoting the beginning and/or end of a data frame.

The properly byte/nibble aligned framed data is provided by framer 632 to transmission convergence (PLCP or HEC) framer 633, which serves to delineate the cells contained in the incoming data. Data cells from framer 633 are provided in a parallel fashion to processing circuitry 635 which is controlled by microprocessor 636, which has access to memory system 637.

Processing circuitry 635 assists RISC processor 636, by performing a number of functions. First circuitry 635 performs an error detection and correction function, by generating a CRC on the incoming data and comparing that with a CRC stored as part of the incoming data. Circuitry 635 also performs a processor interfacing function, which serves to insure proper timing to and from the memory system 637, and framer 633, and circuits 638-1, 638-2 and 638-3. The resulting data from processor 635 is applied to one of a plurality of first-in-first-out (FIFO) circuits 638. In the embodiment shown in FIG. 6, three such FIFO circuits 638 are used for the following purposes. FIFO circuit 638-1 provides the highest priority queuing of cells to cell bus 403 of the received information from an entire T1 signal carrying 24 channels of voice/data information. FIFO circuit 638-2 is a buffer which serves to queue individual voice/data channel information, when received from a user with a DS0 data protocol. FIFO circuit 638-3 serves to queue variable bit rate data received from the ATM network to cell bus 403. The output of each FIFO circuit 638-1 through 638-3 is applied to cell bus interface 639 for application to cell bus 403. Naturally, it will be appreciated that other types of FIFO circuits 638 can be employed in accordance with the teachings of this invention in addition to those shown in the exemplary embodiment of FIG. 6. Appropriate information is contained in the incoming data stream from the ATM network to define the type of data being received, allowing the routing function of processor circuit 635 to route received data to the appropriate one of the FIFO circuits 638.

The cell bus side 670 of network interface module 402 operates in a corollary fashion. When information is received from the user vis cell bus 403, it is not received in a standard ATM format. This data is received by cell bus interface unit 679 for application to FIFO circuits 678-1 through 678-3. FIFO circuits 678-1 through 678-3 correspond generally to FIFO circuits 638-1 through 638-3 of input side 630 of NIM 402. Output data from cell FIFO 678-1 through 678-3 is provided, in accordance with their priorities, to processing circuitry 675 which is assisted by RISC processor 676 to perform a number of functions. These functions are similar to those described previously with respect to input side 630, and include a word alignment function, CRC generation and checking, and a processor interfacing function. The resulting data is provided to framer 674 which serves to place the appropriate transmission convergence (PLCP or HEC) sublayer on the outgoing cells. The output from framer 674 is provided to framer 672 which serves to insert the appropriate DS3/E3 framing bits into the data. The output from framer 672 is fed to line interface unit 671, which provides an appropriate electrical interface to the ATM switch.

During the operation of network interface module 402, when data is to be sent to the ATM switch after being received from a user (via the subscriber interface module 401 and cell bus 403), it is important that traffic shaping be provided. Traffic shaping serves to ensure that data is not sent to the ATM switch at a rate faster than the receiving station, connected to ATM switch at a distant location, can receive it. It also ensures that the data accumulating at any intermediate ATM switches does not exceed the switching and buffering capacity of that ATM switch. For this reason, the ATM protocol requires ATM packets to include a connection ID indicating that this packet is part of a data connection between two specific ATM nodes. The connection ID contained within each ATM packet includes a virtual path ID (VPI) and a virtual connection ID (VCI). The VPI/VCI information is established in advance, based on the specific stations which are to communicate these packets, and the data rates capable by each of those stations. These data rates are defined to include both the average data rate and a peak data rate, and data rate shaping may be necessary to ensure that data is transferred in an efficient manner. For example, for proper data rate shaping, it is important to know whether data between two stations will be sent in rather constant bursts, or in high volume bursts sent rather infrequently.

All of this information goes into a database so that the database can be accessed based on the VPI/VCI information to determine data rate information. This data rate information indicates how fast data should be sent by network interface module 402 to the ATM switch, as a function of the data rate of the receiving station and intermediate ATM switches. Furthermore, it is typical that different types of data have different priorities. For example, it is normally expected that voice data has the highest priority, since voice data indicates that people are carrying on a conversation in real time and packets containing voice information should not be unduly delayed. On the other hand, computer information contained in data packets can be delayed somewhat without a significant single channel voice/data problem. Thus, it is common for 24 channels of voice/data to have priority 1, (DS0) to have priority 2, and variable bit rate data to have priority 3.

Thus, when cell bus side 670 of network interface module 402 handles data received from the cell bus 403, processor circuit 676 performs these prioritization and traffic shaping functions. Data cells are analyzed to determine their priority and, using the VPI/VCI look-up table, the data rate associated with their receiving station. Based on this information, information cells are moved to a traffic shaping ring at appropriate locations on that ring so that these data cells are output to the ATM switch in an appropriate sequence, with higher priority data cells being generally transmitted prior to lower priority data cells, and the transmission of data cells to a given destination, regardless of their priority, being transmitted so as not to exceed the data rate of the receiving station or intermediate ATM switches.

Due to the large amounts of data which are received by network interface module 402 from cell bus 403, which must be manipulated and properly placed on the traffic shaping ring for later extraction and placement in a traffic queue prior to being sent to the ATM switch, a significant bandwidth is necessary for this activity. Thus, traffic shaping rings are typically formed from large amounts of static random access memory (SRAM) operating at high speed and consuming significant power, as is the output queue. The manipulation of this information is performed by custom designed integrated circuits operating as high speed state machines in order to provide the high speed processing required to handle the significant amounts of data being received from cell bus 403. Thus, a significant expense is incurred in designing such processors, and their manufacturing cost is relatively high due to the rather small volume of components which are fabricated. Furthermore, the use of high speed SRAM in large quantities for the traffic shaping ring and output queue is expensive, and consumes a large amount of space and power.

Figure 7A:
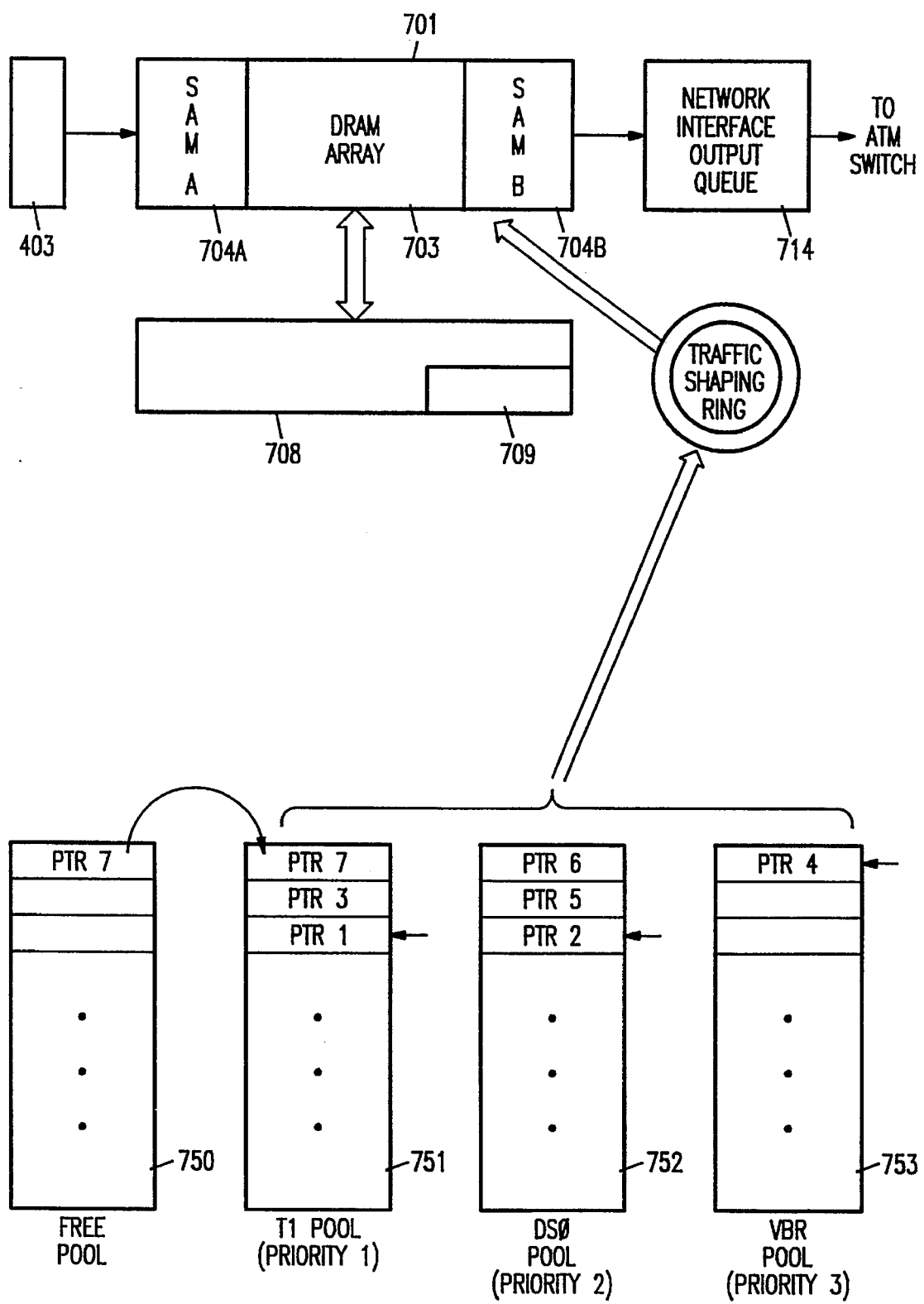
FIG. 7a is a diagram depicting a portion of memory system 677 of a network interface module of this invention.

In accordance with the teachings of this invention, a novel network interface module 402 is taught in which a portion of memory system 677, configured as shown in FIG. 7a, is formed as a simple, relatively low speed/low power memory, thereby having significant reductions in cost, power consumption, and physical space requirements. In accordance with this invention, this memory is controlled using, for example, standard off the shelf microprocessors which are programmed to provide the necessary operating function, and without the requirement for a custom design high speed state machine device with its significantly increased cost. Cell data is received and stored in the low cost memory at an available location and the contents of each memory location is monitored by a series of pointer stacks or "pools".

One embodiment of this feature of the present invention is shown in FIG. 7a, in which cell bus 403 provides cell data to memory device 701 which comprises, for example, a video RAM of well known device and which is readily available from a number of vendors. A video RAM such as video RAM 701 includes a standard DRAM array 703 and an input serial access memory (SAM) 704a, and an output serial access memory 704b. Cell bus 403 provides serial data cells to VRAM 701, which are serially loaded into SAM 704a. VRAM controller 708 is notified when bits are ready to enter SAM704a. The VRAM controller finds an available location in the VRAM by "popping" the stack of free pool 750 which contains a set of pointers of unused locations in DRAM array 703. It then programs the SAM and VRAM with this pointer. VRAM controller 708 then counts the number of bits serially entering SAM 704a in order to delineate a cell boundary, indicating when all bits of the data cell have been serially loaded into SAM 704a. At this time, VRAM controller 708 causes bits stored in SAM 704a to be transferred in parallel to an available location in DRAM 703 of VRAM 701. Based on the type of data contained in the cell which has been received by SAM 704a for transfer to DRAM array 703, the pointer from free pool 750 is transferred to one of a plurality of pools indicating the priority of cell data stored in DRAM array and the order in which those cells of various priorities have been placed into DRAM array 703. In the embodiment of FIG. 7a, these pools are T1 pool 751, DS0 pool 752, and VBR pool 753. As previously described, these pools are typically assigned priorities 1, 2, and 3, respectively. Appropriate addressing techniques are used to indicate within a given one of these pools 751 through 753 which pointer should be used next to transfer cell information from DRAM array 703 to serial access memory 704b for transfer to network interface output queue 714, which is then transferred out to the ATM switch.

In the example shown in FIG. 7a, with the various pointer information stored in the pools as shown in FIG. 7a, cell data will be transferred from DRAM 703 to network interface output queue 704 in the following sequence: PTR1, PTR3, PTR7, PTR2, PTR5, PTR7, and PTR4. Of course, it is likely that additional cell data will be received from cell bus 403 for storage in DRAM array 703 before this sequence of cell data transfer from DRAM array 703 is accomplished. In this event, additional pointers will be loaded into various ones of pools 751 through 753, and the above sequence of transfer of cell data from DRAM array 703 will be altered due to the additional pointers stored in the pools.

When each cell of data is ready for transfer from DRAM array 703 to SAM 704b, a pointer is removed from the appropriate one of pools 751 through 753 and is used to program the VRAM, then it is placed back into free pool 750. This indicates that that cell location within Dram array 703 is once again available for storage of an incoming cell of data received from cell bus 403. In operation under the control of a microprocessor (not shown), when SAM 704*b* is available following a transfer of its contents to network interface output queue 714, the microprocessor causes a transfer of the currently indexed pointer from the highest priority non-empty queue formed by pools 751 through 753. The microprocessor evaluates the VPI/VCI information contained in the cell stored in the data of DRAM array 703 pointed to by that transferred pointer in order to determine the necessary data rate shaping necessary for that cell of information. The microprocessor does this by looking at the database look-up table, using the VPI/VCI of the pointed to cell as a key and information stored in the database portion of the memory system indicating when the last cell of data was sent to the same destination. Based on this information, the microprocessor causes the pointer to be placed in the appropriate location on the traffic shaping ring. During the indexing of the traffic shaping ring, when a given location in the traffic shaping ring is reached, the contents of that location is a pointer which has been moved from the appropriate one of pools 751 through 753, and thus indicates the location within DRAM array 703 of the cell data which is to be moved to the output queue. The microprocessor uses this pointer which has been read from the traffic shaping ring to cause that cell of data to be transferred from DRAM array 703 to SAM704*b*, which information is then serially moved from SAM 704*b* to the ATM switch.

Thus, in accordance with the teachings of this invention, the significant amount of data forming the data cells is read from cell bus 403 serially into SAM 704*a*, transferred in parallel fashion to DRAM array 703, and later transferred to SAM 704*b* for serial transmission to the ATM switch. During this time, there is very little manipulation of the cell data itself since it is simply stored in video RAM 701. However, in accordance with the teachings of this invention, a significant amount of manipulation is performed utilizing a standard microprocessor and a series of pointer pools indicating the location of various data cells within video RAM 701. It is these pointers which are stored on the traffic shaping ring, which is later used to output the actual cell data from video RAM 701 to the ATM switch. Thus, in accordance with the teachings of this invention, a relatively slow (as compared with high power/high cost SRAM) video RAM is used to store cell information, and the variety of manipulations to determine pointer information is achieved quickly since pointers are relatively short (typically 16 bits, as compared with a typical cell size of 424 bits). In one embodiment of this invention, approximately 32 clock ticks are required to parallel load cell data into SAM 704*a*, 3 to 4 clock ticks are required to transfer the cell data from SAM 704*a* to DRAM array 703, and approximately 3 to 4 clock ticks are required to move cell data from DRAM array 703 to SAM 704*b*. In one embodiment, the pools are implemented using the same technology as that typically utilized in SRAM. Therefore, the time to manipulate a 16 bit pointer is the same as manipulating 16 bits of SRAM data. But since the amount of pool is significantly less than that normally needed to implement this function in SRAM, significant cost, power and board space reductions are achieved in accordance with this invention.

DRAM controller 708 also provides the necessary DRAM refresh cycles necessary to maintain the storage of its data.

Arbiter 709 ensures that accesses to the DRAM from the RISC processor and the VRAM circuitry that accesses the DRAM is achieved without interfering with each other's accesses. It grants access to the DRAM on a first-come-first-serve basis. However, in the event of a simultaneous access it will favor the DRAM controller.

Figure 7B:
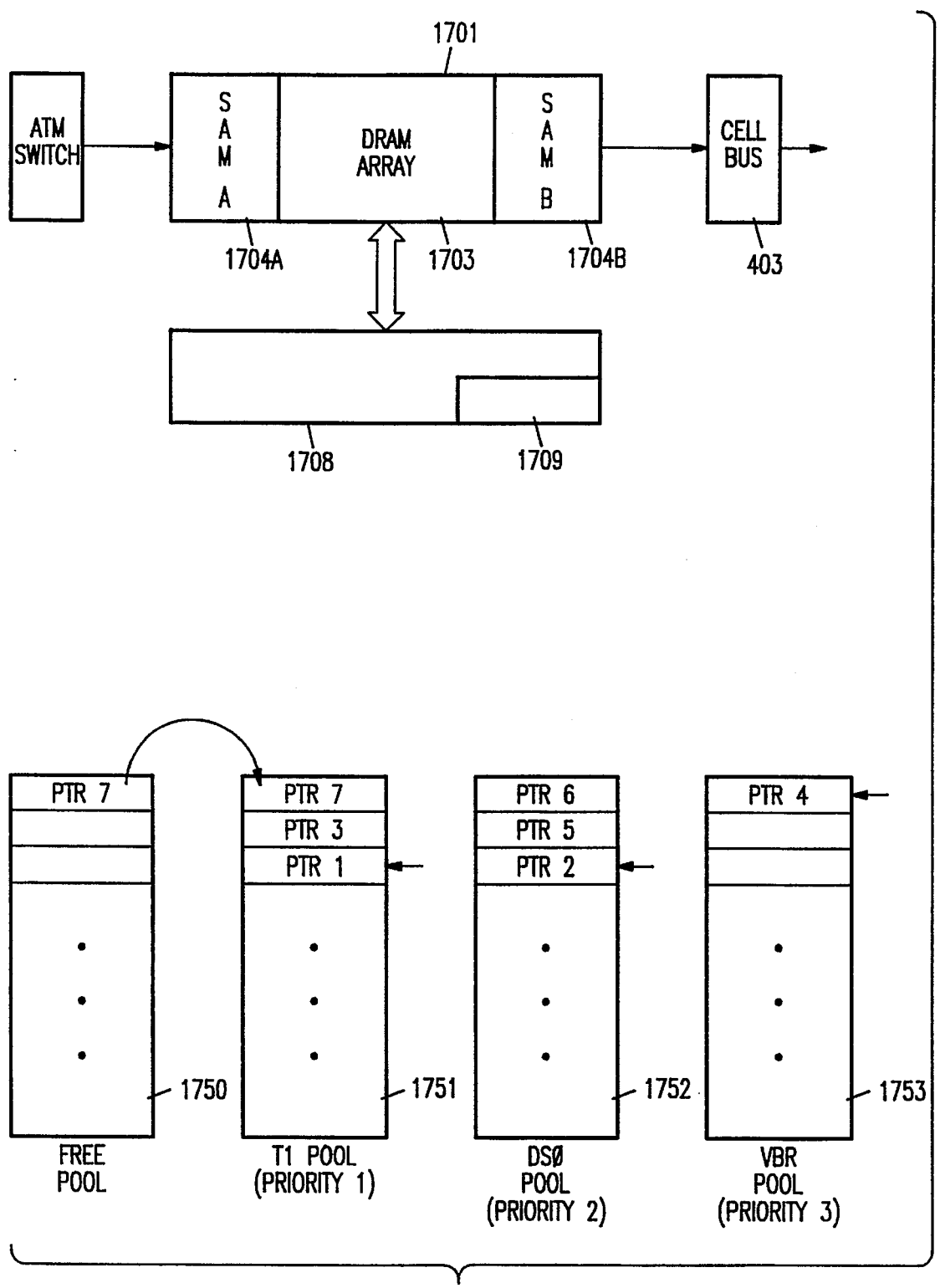
FIG. 7b is a diagram depicting a portion of memory system 677 of a service interface module of this invention.

In accordance with the teachings of this invention, a novel interface module 402 (FIG. 6) is taught in which a portion of memory system 637, configured as shown in FIG. 7*b*, is formed as a simple, relatively low speed/low power memory, thereby having significant reductions in cost, power consumption, and physical space requirements. In accordance with this invention, this memory is controlled using, for example, standard off the shelf microprocessors which are programmed to provide the necessary operating function, and without the requirement for a custom design high speed state machine device with its significantly increased cost. Cell data is received and stored in the low cost memory at an available location and the contents of each memory location is monitored by a series of pointer stacks or "pools".

One embodiment of this feature of the present invention is shown in FIG. 7*b*, in which the ATM switch provides cell data to memory device 1701 which comprises, for example, a video RAM of well known device and which is readily available from a number of vendors. A video RAM such as video RAM 1701 includes a standard DRAM array 1703 and an input serial access memory (SAM) 1704*a*, and an output serial access memory 1704*b*. The ATM switch provides serial data cells to VRAM 1701, which are serially loaded into SAM 1704*a*. VRAM controller 1708 is notified when bits begin to enter SAM 1704*a*, and VRAM controller 1708 then counts the number of bits serially entering SAM 1704*a* in order to delineate a cell boundary, indicating when all bits of the data cell have been serial loaded into SAM 1704*a*. At this time, VRAM controller 1708 causes bits stored in SAM 1704*a* to be transferred in parallel to an available location in DRAM 1703 of VRAM 1701. The available location is determined by "popping" the stack of free pool 1750 which contains a set of pointers of unused locations in DRAM array 1703. Based on the type of data contained in the cell which has been received by SAM 1704*a* for transfer to DRAM array 1703, the pointer from free pool 1750 is transferred to one of a plurality of pools indicating the priority of cell data stored in DRAM array and the order in which those cells of various priorities have been placed into DRAM array 1703. In the embodiment of FIG. 7*b*, these pools are T1 pool 1751, DS0 pool 1752, and VBR pool 1753. As previously described, these pools are typically assigned priorities 1, 2, and 3, respectively. Appropriate addressing techniques are used to indicate within a given one of these pools 1751 through 1753 which pointer should be used next to transfer cell information from Dram array 1703 to serial access memory 1704*b* for transfer to cell bus 403.

In the example shown in FIG. 7*b*, with the various pointer information stored in the pools as shown in FIG. 7*b*, cell data will be transferred from DRAM 1703 to output queue in the following sequence: PTR1, PTR3, PTR7, PTR2, PTR5, PTR7, and PTR4. Of course, if is likely that additional cell data will be received from the ATM switch for storage in DRAM array 1703 before this sequence of cell data transfer from Dram array 1703 is accomplished. In this event, additional pointers will be loaded into various ones of pools 1751 through 1753, and the above sequence of transfer of cell data from DRAM array 1703 will be altered due to the additional pointers stored in the pools.

When each cell of data is transferred from Dram array 1703 to SAM 1704*b*, that pointer is removed from the appropriate one of pools 1751 through 1753 and placed back into free pool 1750, indicating that that cell location within DRAM array 1703 is once again available for storage of an incoming cell of data received from the ATM network.

In operation under the control of a microprocessor (not shown), when SAM 1704b is available following a transfer of its contents to the cell bus, the microprocessor causes a transfer of the currently indexed pointer from the highest priority nonempty queue formed by pools 1751 through 1753.

Thus, in accordance with the teachings of this invention, the significant amount of data forming the data cells is read from the ATM serially into SAM 1704a, transferred in parallel fashion to DRAM array 1703, and later transferred to SAM 1704b for serial transmission to cell bus 403. During this time, there is very little manipulation of the cell data itself since it is simply stored in video RAM 1701. However, in accordance with the teachings of this invention, a significant amount of manipulation is performed utilizing a standard microprocessor and series of pointer pools indicating the location of various data cells within video RAM 1701. Thus, in accordance with the teachings of this invention, a relatively slow (as compared with high power/high cost SRAM) video RAM is used to store cell information, and the variety of manipulations to determine pointer information is achieved quickly since pointers are relatively short (typically 16 bits, as compared with a typical cell size of 424 bits).

Figure 8:
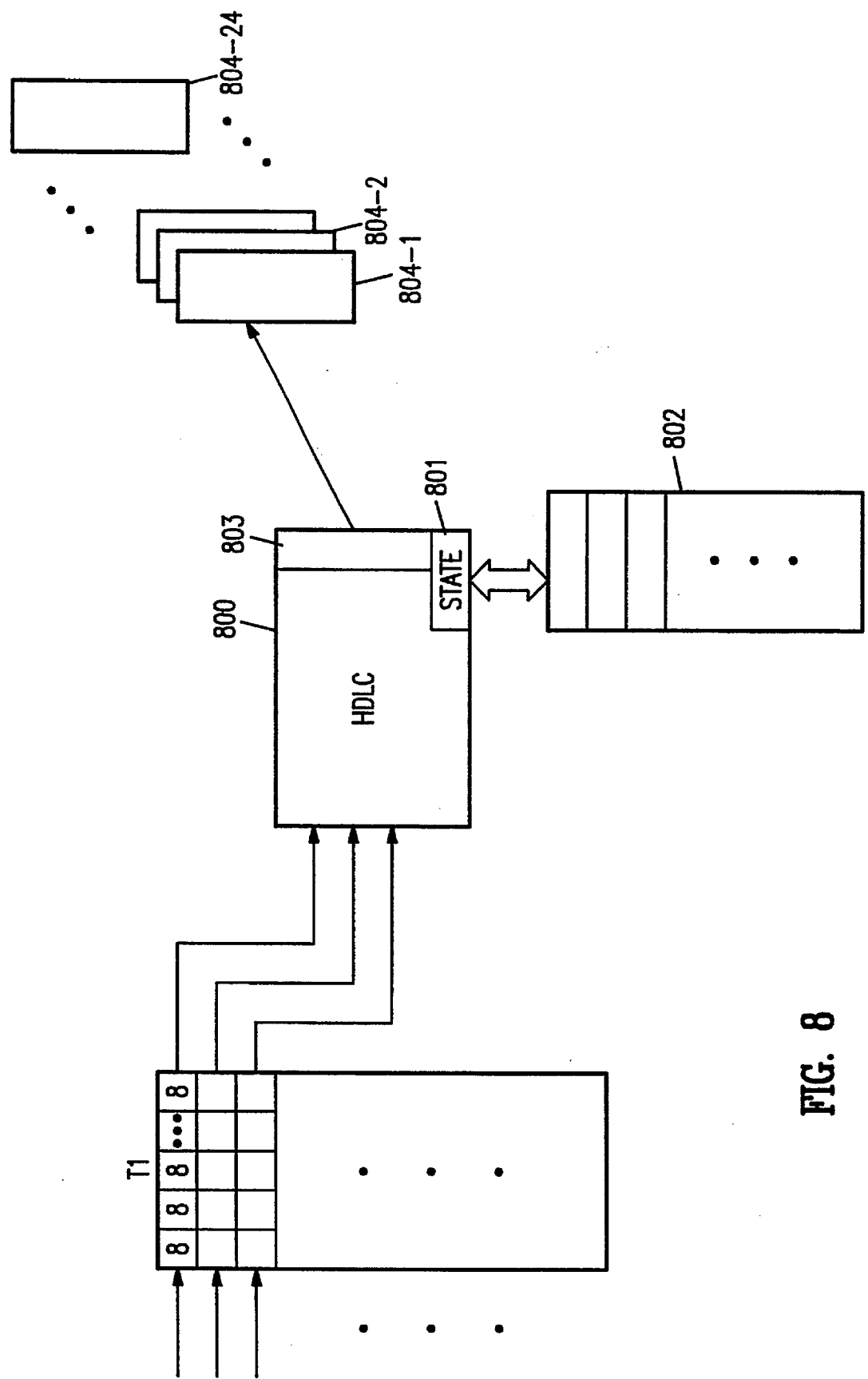
FIG. 8 is a diagram depicting one embodiment of an HDLC controller of this invention.

FIG. 8 depicts one embodiment of HDLC controller 800 which is suitable for use in framing a plurality of channels. Shown in FIG. 8, a T1 signal includes a plurality of separate channels (for example 24) which are multiplexed so that each channel provides eight bits of data at a time. As previously described with respect to FIG. 5, HDLC framers 533 and 573 must provide the appropriate framing of data for a given channel of the T1 carrier. HDLC 800 serves to perform the HDLC framing function for a number of channels simultaneously, thereby minimizing circuit complexity and cost as compared with the prior art which would provide a dedicated HDLC framer for each one of the T1 channels. HDLC conversion is required in order to ensure the detection, accuracy and delineation of frames or packets of information and entails the following operation:

1) Flag insertion and deletion. In one embodiment, a flag is defined as a "0111 1110" binary bit pattern.

2) Zero stuffing and destuffing of the frame or packet data. This is the insertion of a binary bit "zero" into the frame or packet data stream after five "ones" have been sent. This ensures that a sequence resembling a "flag" is not contained in the frame or packet data stream.

3) Cyclic Redundancy Check (CRC) calculation. This is done to ensure the accuracy of the data bit within the frame or packet. When a frame or packet is transmitted, a CRC is generated incorporating the transmitted data pattern and is appended to the frame. At the receiving end, the reverse CRC is generated on the same data then compared to the CRC that was appended to the received frame or packet. If a correct match is found then the frame or packet is accepted as accurate. If a correct match is not found, the packet is discarded.

4) Detection and generation of an "abort" sequence. An abort sequence is defined as seven consecutive binary bit ones ("1111111"). Reception of an abort sequence forces the receive HDLC controller to immediately terminate and discard the frame currently being received. Generation of an abort sequence is only done when a non-recoverable error event occurs during transmission of a frame or packet that would severely compromise the accuracy of the data contained within.

Thus, the HDLC conversion must be performed on the entire set of bits in a frame. In accordance with the teachings of this invention, rather than providing a separate HDLC controller for each channel so that an entire frame of data can be accumulated for each channel prior to operation of its associated HDLC controller, the present invention utilizes a single TIME multiplexed HDLC controller 800. HDLC controller 800 operates sequentially under each channel. As each of the eight bits of each channel is received the eight bits of data are stored in data buffer 803. As HDLC 800 manipulates a given channel when eight bits of the channel data are received, HDLC controller 800 takes a state associated with that channel stored in state register 800 and transfers it to state pool 802. As the next eight bits of data are received on the next sequential T1 channel, HDLC controller 800 receives the stored state associated with that channel from state pool 802 and stores it in state register 801. HDLC controller 801 then utilizes that state and the newly received eight bits of that channel in order to further perform the HDLC conversion, arriving at a new intermediate state. That intermediate state is replaced in state pool 802, the eight data bits transferred from data buffer 803 to the appropriate one of memories 804 through 804-24 correspond to the channel to which the eight bits of data belongs, and the interim state previously stored for the next adjacent channel is retrieved from state pool 802 and placed in state register 801, allowing HDLC controller 800 to continue the HDLC conversion on the next eight bits received from the next sequential channel. Thus, the operation of HDLC controller 800, in the T1 receive direction, may be described as follows, for an example applicable to a T1 system having 24 channels and N octets per frame:

1) initialize state (CH1)—state (CH24) in state pool 802 For i=1 to N For j=1 to 24

2) receive with set of 8 bits of channel j 3) retrieve intermediate HDLC state of channel j from pool 802

4) perform HDLC flag detection/deletion, zero destuffing, abort detection and CRC checking 5) store intermediate HDLC state of channel j in pool 802

6) store the resultant output data 803 in data pool 804-j

7) next j 8) next i

The operation of HDLC controller 800, in the T1 transmit direction, may be described as follows for the same example:

initialize state (CH1)—state (CH24) in state pool 802 For i=1 to N For j=1 to 24

2) receive with set of 8 bits of data pool 804-J

3) retrieve intermediate HDLC state of channel j from pool 802

4) perform HDLC flag insertion, zero stuffing, abort generation and CRC generation/insertion 5) store intermediate HDLC state of channel j in pool 802

6) transmit the resultant output T1 data in channel j 7) next j 8) next i

Figure 9:
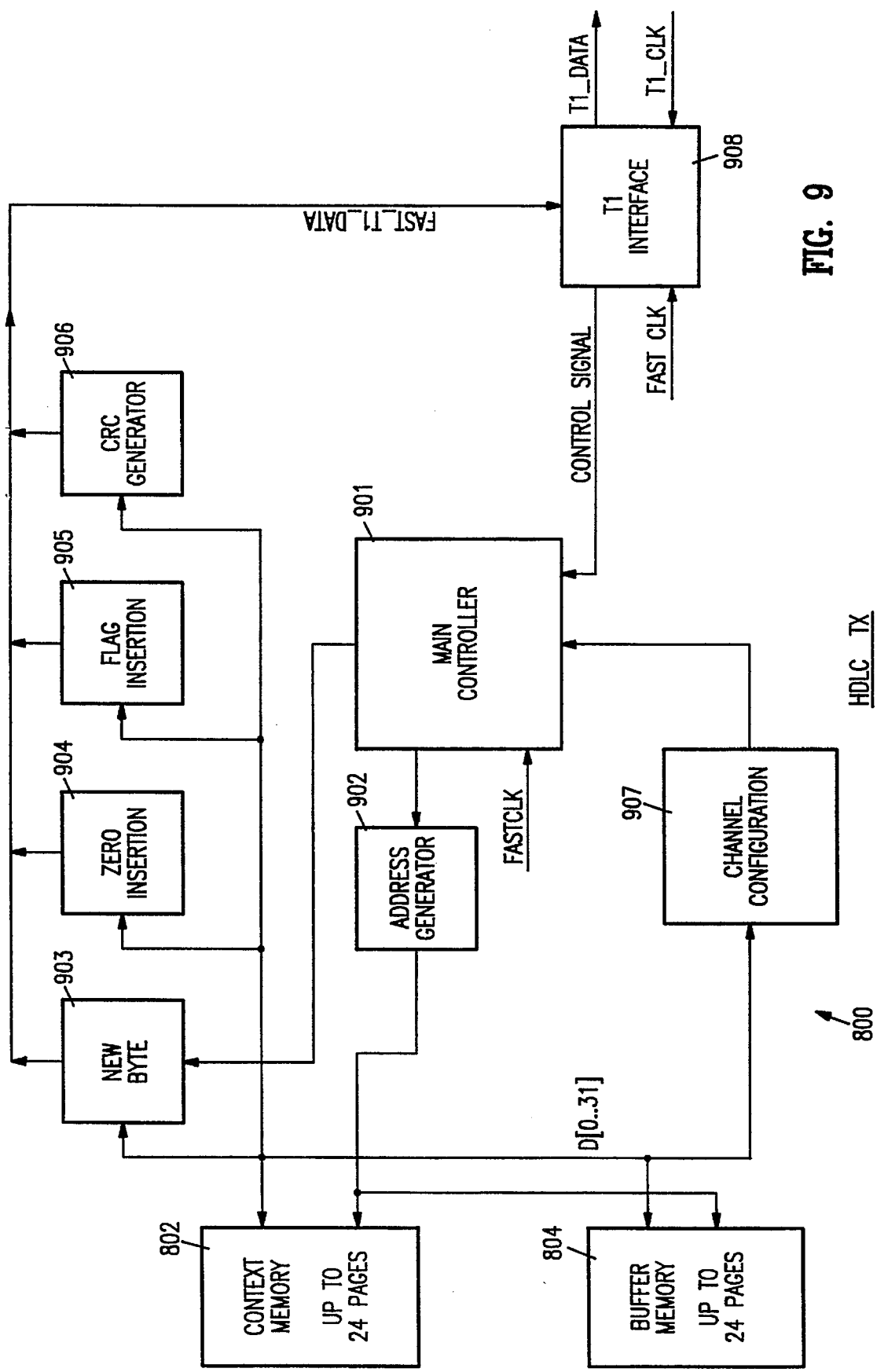
FIG. 9 is a block diagram depicting one embodiment of an HDLC transmit side circuitry corresponding to the HDLC controller of FIG. 8.

FIG. 9 is a block diagram showing in more detail the transmit operation of HDLC controller 800 of FIG. 8. In the transmit mode, the data to be applied to HDLC controller 800 is stored in buffer memory 804. The data is arranged in buffer memory pages 804-1 through 804-24, corresponding to the outgoing data channels and the state information stored in memory 802. Address generator 902 generates the channel address, in sequence. Channel configuration circuit 907 stores the channel data relationship descriptions. These descriptions determine when multiple channels are to be treated as a larger single channel, or if all channels should be treated separately. Main controller 901, in conjunction with address generator 902, uses the control signals from T1 Interface 908 and channel configuration 907 to produce the addresses to retrieve the corresponding buffer memory page from buffer memory 804 and the corresponding state from context memory 802. The state is first loaded into circuits 903, 904, 905, and 906 then the data from buffer memory 804 is clocked into new byte circuit 903. This byte then is examined to determine if zero insertion, flag insertion and/or CRC generation is to be performed on this byte. Zero insertion circuit 904 will insert a zero after five consecutive logical ones have been detected in the combination of the new byte and previous byte. The previous byte's logical one content is part of the state data retrieved from context memory 802. Flag insertion is performed by flag insertion circuitry 905. Flag insertions will occur if there is no data in buffer memory 804 for the corresponding channel. CRC generator 906 performs the CRC on the non-flag data and sends this CRC when no data is detected in buffer memory 804. The resultant data from circuits 903, 904, 905 and 906 is sent to T1 interface circuit 908 for transmission to the DS1 port in the corresponding channel.

Figure 10:
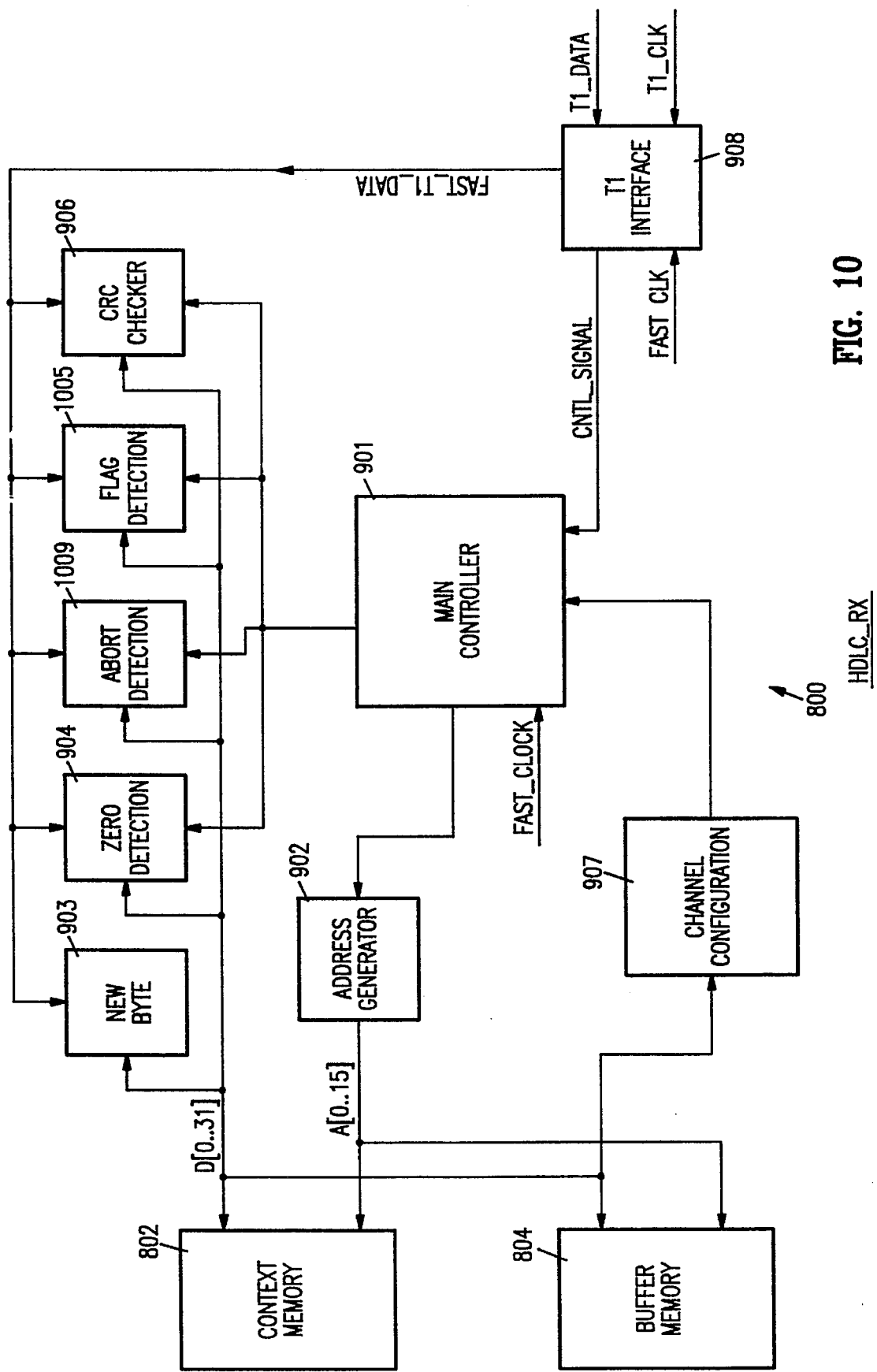
FIG. 10 is a block diagram depicting one embodiment of an HDLC receive side circuitry corresponding to the HDLC controller of FIG. 8.

Referring to FIG. 10, in the receive mode, the data to be applied to HDLC controller 800, received by T1 interface 908 prior to storage in buffer memory 804. The data is arranged in buffer memory pages 804-1 through 804-24, corresponding to the outgoing data channels and the state information stored in memory 802. Address generator 902 generates the channel address, in sequence. Channel configuration circuit 907 stores the channel data relationship descriptions. These descriptions determine when multiple channels are to be treated as a larger single channel, or if all channels should be treated separately. Main controller 901, in conjunction with address generator 902, uses the control signals from T1 Interface 908 and channel configuration 907 to produce the addresses to apply incoming data to the corresponding buffer memory page from buffer memory 804 and the corresponding state to context memory 802. The state is first loaded into circuits 903, 904, 1009, 1005, and 906 then the data from T1 interface 908 is clocked into new byte circuit 903. This byte is examined by flag detection circuit 904, and if it is determined to be a flag it will then be deleted (and not entered into Buffer memory 804), otherwise flag detection circuit 904 will not take any action. If it is a flag and the previous byte was a data byte, then a CRC check will be performed by CRC checker 906 and the results will be stored in buffer memory 804. If the new byte is not a flag, then it is then examined by Abort detection circuit 1009. If it is an Abort sequence, then this indication is stored in buffer memory 804 and the data frame is considered terminated, and no CRC is stored. If it is not an abort sequence, then the new byte is examined for five consecutive logical ones in the combination of the new byte and the previous byte (whose state was retrieved from the context memory 802). If so, then the following zero will be deleted before it is stored in buffer memory 804. The data in buffer memory 804 is then segmented into ATM cells for transmission unto the cell bus.

The above described embodiments are referenced to T1 and T3 carriers, although it is to be appreciated that the teachings of this invention are suitable for use with any appropriate or desirable bandwidths and data lengths. For example, while T1 is a North American standard capable of carrying 24 simultaneous voice/data channels, much of the world uses the E1 standard, capable of carrying 32 simultaneous voice/data channels at a bandwidth of 2.048 megabits/second. In one embodiment of this invention, the system is designed for the E1 standard, capable of handling 32 simultaneous voice/data channels. When this embodiment is used in a T1 environment, such as North America, eight channels are simply not used or saved as spares, thereby allowing a single product capable of handling 32 simultaneous voice data channels under the E1 standard to be used both under the E1 standard and the T1 standard.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An ATM network interface comprising:

an input port for receiving data for placement on said ATM network;

an output port coupled to said ATM network;

a memory array for storing said data received on said input port until said data is placed on said ATM network via said output port;

plurality of pointer pools, each comprising a plurality of locations for storing pointers serving to address a portion of said data stored in said memory array;

a control circuit for storing within said pointer pools addresses corresponding to data stored in said memory array based on a priority for which said data stored in said memory array is to be output to said ATM network via said output port; and a network interface output queue coupled between said memory array and said output port for temporarily storing data read out from said memory array as a function of said priorities, prior to said data being placed on said ATM network.

2. An ATM network interface comprising:

an input port for receiving data for placement on said ATM network;

an output port coupled to said ATM network;

a memory array for storing said data received on said input port until said data is placed on said ATM network via said output port;

a plurality of pointer pools, each comprising a plurality of locations for storing pointers serving to address a portion of said data stored in said memory array, said plurality of pointer pools each having an associated priority, and entries are stored within a selected one of said pointer pools on the basis of priority of data; and a control circuit for storing within said pointer pools addresses corresponding to data stored in said memory array based on a priority for which said data stored in said memory array is to be output to said ATM network via said output port.

3. An ATM network interface as in claim 2 wherein said priorities associated with said pointer pools are established by data types.

4. An ATM network interface comprising:

an input port for receiving data for placement on said ATM network;

an output port coupled to said ATM network;

a memory array for storing said data received on said input port until said data is placed on said ATM network via said output port, said memory array comprising:

a serial input port coupled to said input port of said ATM network interface;

a serial output port coupled to said output port of said ATM network interface;

an input serial access memory coupled to said serial input port;

an output serial access memory coupled to said serial output port; and a word oriented memory array which receives data for storage from said input serial access memory as a set of data bits in parallel and which provides data to said output serial access memory as a set of data bits in parallel; and a plurality of pointer pools, each comprising a plurality of locations for storing pointers serving to address a portion of said data stored in said memory array; and a control circuit for storing within said pointer pools addresses corresponding to data stored in said memory array based on a priority for which said data stored in said memory array is to be output to said ATM network via said output port.

5. An ATM network interface as in claim 4 wherein said memory array comprises a VRAM.

6. An ATM network interface comprising:

an input port for receiving data for placement on said ATM network;

an output port coupled to said ATM network;

a memory array for storing said data received on said input port until said data is placed on said ATM network via said output port;

a plurality of pointer pools, each comprising a plurality of locations for storing pointers serving to address a portion of said data stored in said memory array;

a control circuit for storing within said pointer pools addresses corresponding to data stored in said memory array based on a priority for which said data stored in said memory array is to be output to said ATM network via said output port; and a free pool which stores the available addresses of said memory array where newly received data can be stored.

7. An ATM network interface comprising:

an input port for receiving data for placement on said ATM network;

an output port coupled to said ATM network;

a memory array for storing said data received on said input port until said data is placed on said ATM network via said output port;

a plurality of pointer pools, each comprising a plurality of locations for storing pointers serving to address a portion of said data stored in said memory array;

a control circuit for storing within said pointer pools addresses corresponding to data stored in said memory array based on a priority for which said data stored in said memory array is to be output to said ATM network via said output port; and a traffic shaping ring comprising a memory for storing a plurality of said pointers output from said pointer pools based on said priorities, and circuitry for sequentially removing said pointers from said traffic shaping ring and causing said data stored within said memory array associated therewith to be placed on said ATM network.

8. An ATM network interface as in claim 7 wherein said priority is established, at least in part, based on the receive capacity of a destination.

9. An ATM network interface comprising:

a plurality of output ports coupled to one or more users;

an input port for receiving data from said ATM network, said input port having a bandwidth less than the sum of the bandwidths of said plurality of output ports;

a memory array for storing said data received on said input port until said data is sent to said users via said output port;

a plurality of pointer pools, each comprising a plurality of locations for storing pointers serving to address a portion of said data stored in said memory array; and a control circuit for storing within said pointer pools addresses corresponding to data stored in said memory array based on a priority for which said data stored in said memory array is to be output to said users via said output port.

10. An ATM network interface comprising:

an input port for receiving data from said ATM network;

an output port coupled to one or more users;

a memory array for storing said data received on said input port until said data is sent to said users via said output port;

a plurality of pointer pools, each comprising a plurality of locations for storing pointers serving to address a portion of said data stored in said memory array, said plurality of pointer pools each having an associated priority, and entries are stored within a selected one of said pointer pools on the basis of priority of data; and a control circuit for storing within said pointer pools addresses corresponding to data stored in said memory array based on a priority for which said data stored in said memory array is to be output to said users via said output port.

11. An ATM network interface as in claim 10 wherein said priorities associated with said pointer pools are established by data types.

12. An ATM network interface comprising:

an input port for receiving data from said ATM network;

an output port coupled to one or more users;

a memory array for storing said data received on said input port until said data is sent to said users via said output port, said memory array comprising:

a serial input port coupled to said input port of said ATM network interface;

a serial output port coupled to said output port of said ATM network interface;

an input serial access memory coupled to said serial input port;

an output serial access memory coupled to said serial output port; and a word oriented memory array which receives data for storage from said input serial access memory as a set of data bits in parallel and which provides data to said output serial access memory as a set of data bits in parallel; and a plurality of pointer pools, each comprising a plurality of locations for storing pointers serving to address a portion of said data stored in said memory array; and a control circuit for storing within said pointer pools addresses corresponding to data stored in said memory array based on a priority for which said data stored in said memory array is to be output to said users via said output port.

13. An ATM network interface as in claim 12 wherein said memory array comprises a VRAM.

14. An ATM network interface comprising:

an input port for receiving data from said ATM network;

an output port coupled to one or more users;

a memory array for storing said data received on said input port until said data is sent to said users via said output port;

a plurality of pointer pools, each comprising a plurality of locations for storing pointers serving to address a portion of said data stored in said memory array;

a control circuit for storing within said pointer pools addresses corresponding to data stored in said memory array based on a priority for which said data stored in said memory array is to be output to said users via said output port; and a free pool which stores the available addresses of said memory array where newly received data can be stored.

15. An ATM network interface comprising:

an input port for receiving data from said ATM network;

an output port coupled to one or more users;

a memory array for storing said data received on said input port until said data is sent to said users via said output port;

a plurality of pointer pools, each comprising a plurality of locations for storing pointers serving to address a portion of said data stored in said memory array;

a control circuit for storing within said pointer pools addresses corresponding to data stored in said memory array based on a priority for which said data stored in said memory array is to be output to said users via said output port; and a traffic shaping ring comprising a memory for storing a plurality of said pointers output from said pointer pools based on said priorities, and circuitry for sequentially removing said pointers from said traffic shaping ring and causing said data stored within said memory array associated therewith to be placed on said output port.

16. An ATM network interface as in claim 15 wherein said priority is established, at least in part, based on the receive capacity of a destination.

17. A method for operating an ATM network interface comprising the steps of:

receiving input data;

storing said data in a memory;

maintaining a plurality of pointer pools, each storing a set of pointers serving as addresses associated with said data stored in said memory;

moving said pointers from said pointer pools to a traffic shaping ring; and outputting data from said memory based on the order of pointers on said traffic shaping ring, wherein pointers are stored within said pointer pools based on priority of data.

18. A method for operating an ATM network interface comprising the steps of:

receiving input data;

storing said data in a memory;

maintaining a plurality of pointer pools, each storing a set of pointers serving as addresses associated with said data stored in said memory;

moving said pointers from said pointer pools to a traffic shaping ring; and outputting data from said memory based on the order of pointers on said traffic shaping ring, wherein said pointers are placed on said traffic shaping ring based on priority of data.

19. A method as in claim 18 wherein said priority of data is established, at least in part, based on the receive capacity of a destination.

20. An HDLC controller comprising:

an input port for receiving data;

an output port;

a first memory comprising a plurality of memory sections, each associated with a channel of data;

a second memory comprising a plurality of memory sections, each for storing state information associated with a given one of said channels of data;

control circuitry for retrieving from said second memory state information associated with a channel of data being received;

HDLC manipulation circuitry for performing an HDLC operation on said channel of data being received, in conjunction with said retrieved state information corresponding to previous data received for the same channel of data;

control circuitry for updating said state information associated with said channel of data and storing the updated state information in said second memory; and control circuitry for transferring the result of said HDLC operation to the appropriate one of said memory locations within said first memory.

21. A multi-channel network interface controller comprising:

an input port for receiving data from a plurality of data channels;

an output port;

a first memory comprising a plurality of memory sections, each associated with one of said data channels;

a second memory comprising a plurality of memory sections, each for storing state information associated with a given one of said data channels;

control circuitry for retrieving from said second memory state information associated with a data channel being received;

manipulation circuitry for performing an operation on said channel of data being received, in conjunction with said retrieved state information corresponding to previous data received for the same data channel;

control circuitry for updating said state information associated with said data channel and storing the updated state information in said second memory; and control circuitry for transferring the result of said operation to the appropriate one of said memory locations within said first memory.

22. A device as in claim 21 wherein said manipulation circuitry further comprises a set of instructions defining said operation based, at least in part, by the format of data received from one or more of said data channels.

23. An ATM network interface comprising:

an plurality of input ports for receiving data for placement on said ATM network;

an output port coupled to said ATM network, the bandwidth of said output port being less than the sum of the bandwidths of said plurality of input ports;

a memory array for storing said data received on said input port until said data is placed on said ATM network via said output port;

a plurality of pointer pools, each comprising a plurality of locations for storing pointers serving to address a portion of said data stored in said memory array; and a control circuit for storing within said pointer pools addresses corresponding to data stored in said memory array based on a priority for which said data stored in said memory array is to be output to said ATM network via said output port.

* * * * *